US006801908B1

United States Patent
Fuloria et al.

(10) Patent No.: US 6,801,908 B1
(45) Date of Patent: Oct. 5, 2004

(54) SYSTEM AND METHOD FOR SELECTIVELY PRESENTING MULTI-DIMENSIONAL DATA IN TWO-DIMENSIONAL FORM

(75) Inventors: Manas Chandra Fuloria, Portland, OR (US); Prashant Kumar, Portland, OR (US); Manish Bhatia, Coppell, TX (US)

(73) Assignee: SupplyChainge Inc, Portland, OR (US)

(*) Notice: Subject to any disclaimer, the term of this patent is extended or adjusted under 35 U.S.C. 154(b) by 348 days.

(21) Appl. No.: 10/058,726

(22) Filed: Jan. 28, 2002

(51) Int. Cl.[7] ............................................. G06F 17/30
(52) U.S. Cl. ................................................... 707/3
(58) Field of Search ............................. 707/1, 3, 102

(56) References Cited

U.S. PATENT DOCUMENTS

| | | | | |
|---|---|---|---|---|
| 5,297,280 A | * | 3/1994 | Potts et al. .................... 707/5 |
| 6,421,300 B1 | * | 7/2002 | Thomas et al. ............. 367/135 |
| 6,442,554 B1 | * | 8/2002 | Reddy et al. ............... 707/100 |
| 6,573,916 B1 | * | 6/2003 | Grossweiler et al. ....... 345/850 |
| 6,581,068 B1 | * | 6/2003 | Bensoussan et al. ..... 707/104.1 |

OTHER PUBLICATIONS

Solte et al. Polaris: A System for Query, Analysis and Visualization of Multi–dimensional Relational Databases, IEEE Symposium on Information Visualization, Oct. 2000, pp. 5–14.*

* cited by examiner

Primary Examiner—Jack Choules
(74) Attorney, Agent, or Firm—William L. Botjer

(57) ABSTRACT

A data navigation system and a method that enable a user to selectively view multi-dimensional forecast data in a two-dimensional form. The data navigation system includes a representation means for representing the multi-dimensional data. The system also has a Graphical User Interface that displays the data in two-dimensional form and also enables the user to navigate through the multi-dimensional data through the Interface using an interaction means such as a keyboard, a mouse a voice-command, a touch screen and other such means. The system also has an identification means and an extraction means that identify and obtain the data to be displayed in the Interface from the representation means. The data navigation system can also be used to view any multi-dimensional data in two-dimensional form.

28 Claims, 11 Drawing Sheets

| Style | Color | Size | Width | Jan02 | Feb02 | Mar02 | Apr02 | May02 | Jun02 | Jul02 |
|---|---|---|---|---|---|---|---|---|---|---|
| ProJoggers | ∨ | ∨ | ∨ | 160 | 150 | 150 | 170 | 160 | 150 | 150 |
| ProTennis | ∨ | ∨ | ∨ | 60 | 60 | 50 | 60 | 50 | 50 | 60 |
| | | | | 90 | 80 | 80 | 85 | 80 | 75 | 60 |
| ProGolf | Black | 8 | ∨ | 10 | 10 | 20 | 25 | 30 | 25 | 30 |

Forecasts for styles

302 →

| Sales Period | Jan02 | Feb02 | Mar02 | Apr02 | May02 | Jun02 | Jul02 |
|---|---|---|---|---|---|---|---|
| ProJoggers | 60 | 60 | 50 | 60 | 50 | 50 | 60 |
| ProTennis | 90 | 80 | 80 | 85 | 80 | 75 | 60 |
| ProGolf | 10 | 10 | 20 | 25 | 30 | 25 | 30 |

Demand ratio for style 'ProJoggers'

304 →

| Color | Demand Ratio | Width | Demand Ratio | Size | Demand Ratio |
|---|---|---|---|---|---|
| Blue | 0 | Narrow | 1 | 5 | 1 |
| Black | 1 | Medium | 2 | 6 | 1 |
| Green | 0 | Wide | 1 | 7 | 2 |
| Brown | 1 | | | 8 | 2 |
| Red | 0 | | | 9 | 2 |
| | | | | 10 | 1 |
| | | | | 11 | 1 |

Demand ratio for style 'ProTennis'

306 →

| Color | Demand Ratio | Width | Demand Ratio | Size | Demand Ratio |
|---|---|---|---|---|---|
| Blue | 2 | Narrow | 1 | 5 | 2 |
| Black | 2 | Medium | 1 | 6 | 2 |
| Green | 3 | Wide | 0 | 7 | 3 |
| Brown | 0 | | | 8 | 0 |
| Red | 1 | | | 9 | 1 |
| | | | | 10 | 0 |
| | | | | 11 | 1 |

Demand ratio for style 'ProGolf'

308 →

| Color | Demand Ratio | Width | Demand Ratio | Size | Demand Ratio |
|---|---|---|---|---|---|
| Blue | 0 | Narrow | 0 | 5 | 0 |
| Black | 1 | Medium | 1 | 6 | 0 |
| Green | 0 | Wide | 1 | 7 | 0 |
| Brown | 0 | | | 8 | 1 |
| Red | 0 | | | 9 | 0 |
| | | | | 10 | 0 |
| | | | | 11 | 0 |

FIG. 3

Forecasts for styles

| Sales Period | Jan02 | Feb02 | Mar02 | Apr02 | May02 | Jun02 | Jul02 |
|---|---|---|---|---|---|---|---|
| ProJoggers | 100 | 60 | 50 | 60 | 50 | 50 | 60 |
| ProTennis | 90 | 80 | 80 | 85 | 80 | 75 | 60 |
| ProGolf | 10 | 10 | 20 | 25 | 30 | 25 | 30 |

Demand ratio for style 'ProJoggers'

| Color | Demand Ratio | Width | Demand Ratio | Size | Demand Ratio |
|---|---|---|---|---|---|
| Blue | 0 | Narrow | 1 | 5 | 1 |
| Black | 1 | Medium | 2 | 6 | 1 |
| Green | 0 | Wide | 1 | 7 | 1 |
| Brown | 1 | | | 8 | 3 |
| Red | 0 | | | 9 | 1 |
| | | | | 10 | 2 |
| | | | | 11 | 1 |

Demand ratio for style 'ProTennis'

| Color | Demand Ratio | Width | Demand Ratio | Size | Demand Ratio |
|---|---|---|---|---|---|
| Blue | 2 | Narrow | 1 | 5 | 2 |
| Black | 2 | Medium | 1 | 6 | 2 |
| Green | 3 | Wide | 0 | 7 | 3 |
| Brown | 0 | | | 8 | 0 |
| Red | 1 | | | 9 | 1 |
| | | | | 10 | 0 |
| | | | | 11 | 1 |

Demand ratio for style 'ProGolf'

| Color | Demand Ratio | Width | Demand Ratio | Size | Demand Ratio |
|---|---|---|---|---|---|
| Blue | 0 | Narrow | 0 | 5 | 0 |
| Black | 1 | Medium | 1 | 6 | 0 |
| Green | 0 | Wide | 1 | 7 | 0 |
| Brown | 0 | | | 8 | 1 |
| Red | 0 | | | 9 | 0 |
| | | | | 10 | 0 |
| | | | | 11 | 0 |

FIG. 7

SYSTEM AND METHOD FOR SELECTIVELY PRESENTING MULTI-DIMENSIONAL DATA IN TWO-DIMENSIONAL FORM

BACKGROUND OF THE INVENTION

1. Field of the Invention

The present invention relates to selectively presenting multi-dimensional information in a two-dimensional form using a Graphical User Interface. In particular, it relates to synthesizing and displaying information required in purchase planning, production planning or inventory planning of multiple products in one or more factories, warehouses, or retail stores.

2. Description of the Related Art

Consider a typical company that designs, manufactures, stocks (that is, keeps in its inventory), sells, and manages a wide range of products. Such a company may easily handle several thousand distinct products. For instance, a shoe company may make and sell many varieties of shoes such as jogging shoes, basketball shoes, casual shoes, dress shoes and so on, and in each variety, there may be many different forms and shapes, different colors and different sizes. Similarly, an apparel company may make and sell many varieties of apparel such as trousers, skirts, dresses, shirts, and jeans; and in each variety, there may be different shapes, fabrics, colors and sizes. Indeed, in all of the above-mentioned instances and in many others, there is a significant need to track and manage various kinds and forms of product information, including selling price, cost price, demand forecast, the number of items of the product in stock, etc.

Since the product information in all examples given above as well as in related examples tends to be voluminous, it can be usually handled more efficiently and effectively if this information is structured. Indeed, a company may effectively manage the information by classifying the products into various 'styles', with all the products of the same style sharing important characteristics (typically, basic shape). For each style, this company may then use certain other characteristics for further classification. For instance, a shoe-company may classify its sports shoes into three styles, say, ProJoggers, ProTennis and ProGolf (corresponding to Joggers, Tennis shoes and Golf shoes). Furthermore, this company may want to characterize the ProJoggers style by color, size and width.

To facilitate the management of information related to various products, the notion of a stock-keeping unit (SKU) was introduced several decades ago. An SKU can be considered as a numeric or alphanumeric representation of a particular product. One can therefore use a representation of SKU based on the characteristics of the product. For instance, the ProJoggers shoe style may have come in a variant of color red, size 6, and width medium. An alphanumeric SKU representation of the style might then be 'ProJoggers/red/6/medium'.

Indeed, the number of SKUs related to a product in a typical store, warehouse, or a manufacturing company, may be very high. For instance, in the example of the shoe company given above, if the ProJoggers style of shoes comes in ten sizes, four colors and three widths, then the number of SKUs that are required to represent all possible combinations equals 10*4*3=120. And, then if the company makes, say, 50 different styles, the number of SKUs goes to 6000. Thus, there is an important need to efficiently handle the information that corresponds to the numerous SKUs.

With the advent of computers and information-technology, the handling of such a large number of SKUs has become feasible. A concise representation of products as SKUs automatically lends itself to being structured and managed in various kinds of computer databases. Hence, it is not surprising that many, if not most, product manufacturers, transporters, suppliers and sellers today manage their product information in appropriate computer databases using SKUs.

Consider the example of a footwear company that produces and sells thousands of distinct products. Various employees engaged in the running of the company need to have complete product information such as the number of units in stock for each kind of product, sale price per unit for each kind of product, phase-out date for each product, and other such product information. They may also need to convey product-related information to others, e.g. purchase orders to suppliers, without ambiguity as to which products are being referred to. The use of SKUs and automation to various degrees using computers makes these operations less tedious and time-consuming.

The operation of planning for producing and managing products typically includes preparing forecasts, maintaining and inspecting inventories, monitoring shipments, preparing purchase orders and other related operations. There are many software products in these areas that are available in prior-art; these software products manage information required for such planning operations for a large number of SKUs and for a large number of locations—be they retail stores, warehouses or factories.

Some software solutions have also been used by on-line retail stores. An on-line retail store enables a customer to browse and order various product s using the World Wide Web, Local Area Network or a Wide Area Network. Often such a store may have millions of different kinds of products. In some cases, it may even provide a "one-stop shop" to its customers. Examples of such stores are Amazon.com of Seattle, Wash., USA and eBay Inc. of San Jose, Calif., USA; each of these stores handles product information for a million or more products. Hence, such on-line stores need to handle, for a very large number of products, complete product information including the cost price, selling price, demand forecasts, units in stock, planned receipts, historical sales, ordering agreements with manufacturers, suppliers and transporters, and a lot of related information.

The product information that needs to be created and maintained by many on-line stores is so large and so dynamic in nature that it can only be efficiently handled by computer systems today. Indeed, there are software products today that facilitate the creation and maintenance of such on-line stores. Two such software products are Catalog Architect™, manufactured by IBM, of Armonk, N.Y., USA, and MBuilder™, manufactured by The Internet Factory Inc., of Pleasanton, Calif., USA. These software products provide a simple and detailed method for creating a large number of SKUs in on-line retail stores. Obviously, the underlying idea that has been used in these software products is that of assigning an individual SKU to each product in the retail store. These products are distinguished and classified at the SKU level on the basis of characteristics such as size, color, width and other such characteristics. These products or SKUs can be grouped together on the basis of these characteristics in a collection of SKUs called a SKU set. The salient feature of these software products is their ability to create SKUs that correspond to all valid combinations of various characteristics of the SKU set. For example, a shirt may be described as being available in sizes small, medium and large and in colors red, blue and green. Thus the characteristic color of the product 'shirt' has three values and the characteristic size of the product 'shirt' also has three values. Application of these software tools would lead to creation of a total of nine (=3×3) unique SKUs, in the SKU set corresponding to shirts.

The software products mentioned above allow creation of all valid SKU combinations by simply inputting the characteristics for each SKU set and the permissible set of values for each characteristic. Consider once again the case of the shoe company. Suppose that a particular SKU set, for example 'Men's' Sports Shoes' is available in three styles (e.g. ProJoggers, ProTennis and ProGolf), with each style available in five sizes and three colors. Thus the characteristic size has five values and characteristic color has three values. Hence, the number of SKUs that exist in this SKU set of sports shoes is forty-five (=3×5×3). This structuring of the SKUs in form of SKU sets makes the handling of the product information easier. This, in turn, helps in efficient management of the voluminous product information during various planning operations. Note that the SKU set, which is created at the 'Men's' 'Sports Shoes' level in this example, could have been created at a higher level of aggregation (say, division; e.g., 'All Men's' 'Shoes') or at a lower level (say, style; e.g., ProJoggers.)

Consider a typical planning operation in a company: that of forecasting demand for each kind of a product that the company makes. Clearly, if the company does not have the luxury of building product against firm orders (and perhaps even if it does although then for different reasons) it will attempt to forecast the customer demand for each of these products. Thus, it will determine when and in what amounts to build up stocks of each product in anticipation of demand. The quantity of products to be stocked in an inventory is usually determined on the basis of economic considerations. There are various costs associated with maintaining any quantity of any given product. For example, on one hand, there is a cost incurred in ending up having product quantities that exceed the actual demand. Such quantities may have to be sold at reduced prices resulting in a loss to the company. On the other hand, there is also an opportunity cost incurred in being unable to completely satisfy customer demand. This cost is related to the lost profits as a result of the product being unavailable and a loss of "goodwill of customers" due to the non-fulfillment of their orders. Thus, the quantity of products to be stocked should be determined as precisely and as cost-effectively possible so that profit and "goodwill" are maximized. And in order to determine the optimal inventory plans, the customer demand has to be first estimated.

The customer demand is usually estimated using forecasting techniques known in prior art. For instance, a time series forecasting technique is sometimes used to estimate the demand forecast for various sales periods. However, the forecast of an individual product (at an individual SKU level) is more error-prone than a forecast made at an aggregate level, i.e., for a large number of SKUs. These errors arise due to large variability and unforeseeable fluctuations in the demand forecasts for the products. Hence, the demand forecasts are generally made at an aggregate level, such as an SKU set level, rather than at a lower level, such as an individual SKU level. In the time-series forecasting method, the sales data of previous sales periods are collected and aggregated at an SKU set level to obtain time-series forecasts at an aggregate level. However, it is clear that for various purposes, various individuals will need the forecast for each product, i.e., the forecast at a disaggregated SKU level. Thus, the forecast that is available at an aggregate level, such as an SKU set level, needs to be suitably disaggregated to the lower levels. One method of disaggregating forecasts is described in Nahmias S., Production and Operations Analysis, McGraw Hill publications, 2000. This method uses the concept of 'product demand ratios'. The product demand ratio is defined as the ratio of sales of a particular product (SKU) to the total sales of all products in the corresponding product category (SKU set). This ratio is usually estimated from the historical proportion of sales for various products or SKUs in an SKU set. Thus, the total sales' forecast that has been made at an aggregate level, such as an SKU set level, may be disaggregated to the individual SKU levels by using the product demand ratios.

It should be also pointed out that the forecasting at an SKU level as well as an SKU set level has to be done for different sales periods; these forecasts for multiple sales periods are used by various individuals for the purpose of planning. The amount of data that has to be presented is voluminous and thus has to be presented to the individual in a comprehensible manner. Various software products are available in prior art that present forecasts for multiple sales periods in a structured and disaggregated manner, thereby making it comprehensible.

One such software that allows selective two-dimensional views of forecast information is ForecastPRO™. This software also provides quantitative models for time-series forecasting of the demand. Consider one such typical application of this software in a shoes production unit. For the sake of simplicity, let us suppose that this factory makes shoes in just one style, which comes in different sizes and colors. Let the SKUs in this unit be characterized using size and color. Suppose that the production manager of this unit needs to order raw material (for example, soles) required for all shoes of size 'five'. This requires the forecast of the total demand for shoes of size 'five'. ForecastPRO™ is able to aggregate the SKU demand forecasts along the size characteristic to get the demand forecast for size 'five' shoes. Further, the production manager can use ForecastPRO™ to obtain the demand forecast for 'red' shoes of size 'five'. However, there is no provision in ForecastPRO™ to say, obtain the total demand for all 'red' shoes. This is because Forecast-PRO™ has a pre-defined sequence of characteristics in which the SKU demand forecasts may be aggregated. In the above example, the pre-defined hierarchical sequence of characteristics is size followed by color. This pre-defined sequence severely limits the ability of the production manager to aggregate the demand forecasts in ways that would, if available, be very useful to the manager.

An elegant way of managing the demand forecasts for various sales periods of each SKU is by using an n-dimensional table. One dimension of this table has the different sales periods and another dimension has the top level of aggregation, such as an SKU set, for example, style. The remaining (n−2) dimensions of the table correspond to the (n−2) characteristics of the product. The forecast data for each SKU level for all the sales periods can thus be input in this n-dimensional table. The two-dimensional view of the demand forecasts is obtained by a selectively presenting the n-dimensional demand forecast data into a two-dimensional form. These forecasts that are presented in a two-dimensional table can then be aggregated along different characteristics by the user. The following granted US patent provides a method and system to display n-dimensional information in two dimensions by using multiple two dimensional tables.

U.S. Pat. No. 5,713,020, which is titled "Method and System for generating database queries containing multiple levels of aggregation", discloses a method and a system for displaying the contents of a multiple-level aggregation query. A multiple-level aggregation query is-a set of instructions that return data corresponding to two or more dimensions. This patent discloses a system that represents the n-dimensional data in the form of a table set. The table set contains a table for each dimension of the data. The tables are organized in a hierarchy and a selection means (that allows the selection of a field in the table) is provided in each table. The selection in an upper-level table governs the display in lower level tables. The topmost table corresponds to the most important dimension and hence displays the data aggregated along all dimensions except the most important one. The patent discloses a method whereby a selection can be made in a table and the display of subsequent tables is updated. The data displayed in a table is obtained by disaggregating data in a field selected in the upper table, along a different dimension. Thus, in each table, the data is aggregated according to all the dimensions represented in subsequent tables. Thus, this patent provides a method to navigate through the n-dimensional data, by accessing one-dimension at a time. However, the system requires multiple tables for the information to be displayed. Further, the method disclosed is inadequate in the respect that the order in which the dimensions may be aggregated is pre-defined and invariable.

In order to circumvent the drawbacks described above, what is needed is a system and a method that presents the forecast information in a manner amenable to selective aggregation of product demand forecasts. Planners would appreciate the ability to aggregate demand forecasts along one or more desired sequence of dimensions. For example, this selective aggregation would allow a production manager to estimate the required quantities of different raw materials, say, black leather (for all black shoes) as well as the required number of size 5 soles (for all size 5 shoes). This aggregate information would thus enable bulk orders to be placed, and thereby lead to lower costs in the ordering process.

The need for aggregation of data has been illustrated using the example of a manufacturer. However, it can be clearly seen that this discussion can be extended to cover the cases of transporters, suppliers, retail stores, wholesale merchants and other such cases.

SUMMARY OF THE INVENTION

It is an aim of the invention to provide a data navigation system that enables a user to selectively view multi-dimensional demand forecast data in two-dimensional form by distinguishing the products using one or more dimensions (also referred to as 'characteristics') wherein the demand forecast data may be available at a product category level in a industry and each dimension has a finite number of dimension values used in characterizing the product.

To attain the above-mentioned aim, the data navigation system includes a representation system for representing the demand forecast data, a Graphical User Interface for displaying the data to the user in two dimensions, an interaction system to enable the user to select the data to be viewed in the graphical user interface, an identification system to identify the view of the data requested by the user, and a processing system to extract and process the identified view of the data from the representation system.

The representation system includes a two-dimensional array for storing the aggregate demand forecast data for each product category (SKU set) for all sales periods and a set of arrays wherein each array in the set stores the proportion of demand for each dimension value in a dimension and each such array corresponds to the demand forecast data for one product category.

The Graphical User Interface includes a plurality of rows and columns respectively corresponding to the number of product categories and number of sales periods, a row-updating updating system for inserting and deleting rows and filling the demand forecast data in inserted rows, and a plurality of navigation symbols to enable the user to specify one or more products from a product category for which the demand forecast data is sought.

In an alternative embodiment, each array in the set of arrays stores the proportion of demand for each dimension value in a dimension and each such array corresponds to the demand forecast data for one product category for a particular sales period.

In another alternative embodiment, the data navigation system enables a user to selectively view any multi-dimensional data in two-dimensional form.

In another alternative embodiment, the Graphical User Interface has a cell-editing system that enables a user to edit or update the multi-dimensional data using the Graphical User Interface itself.

In another alternative embodiment, the invention provides a method to represent multi-dimensional data in two-dimensional form.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 2 illustrates a Graphical User Interface according to the present invention.

FIG. 3 is a block diagram of a representation of multi-dimensional data according to the present invention.

FIG. 7 is a block diagram of the representation of updated multi-dimensional data according to the present invention.

DETAILED DESCRIPTION OF THE PREFERRED EMBODIMENTS

The present invention allows a user to selectively view multi-dimensional data in two-dimensions. multidimensional data may be related to planning operations in industry; for example, the data may be the forecast of demand for various products, or the number of units of these products in an inventory.

The present invention provides a data navigation system that enables the user to conveniently browse the multi-dimensional data using a two-dimensional Graphical User Interface.

The best use of the present invention has been illustrated using an example of a shoe manufacturing company. In this company, the forecast for demand for shoes is made for a period of seven months. The seven planning months for which demand forecasts are available are taken to be January '02 to July '02. For the sake of simplicity, we assume that this company manufactures only three broad styles of shoes, namely ProJoggers, ProGolf and ProTennis, corresponding to jogging shoes, tennis shoes and golf shoes, respectively. These are of course manufactured in quantities related to the estimated demand for these products in the planning months. The distinct products or SKUs within these broad styles are identified using dimensions (also referred to as 'characteristics'), such as the color, size and width of the shoe. Corresponding to each dimension is a finite set of values, henceforth referred to as dimension values or characteristic values. Thus, distinct shoe types of style ProJoggers may be distinguished using the dimensions of color, width, and size. A particular shoe type or SKU of style ProJoggers may therefore be of 'Red' color, 'Narrow' width and size '5'. Hence, every SKU is distinguished using a set of dimension values corresponding to the dimensions used to distinguish the corresponding style.

Figure 1:
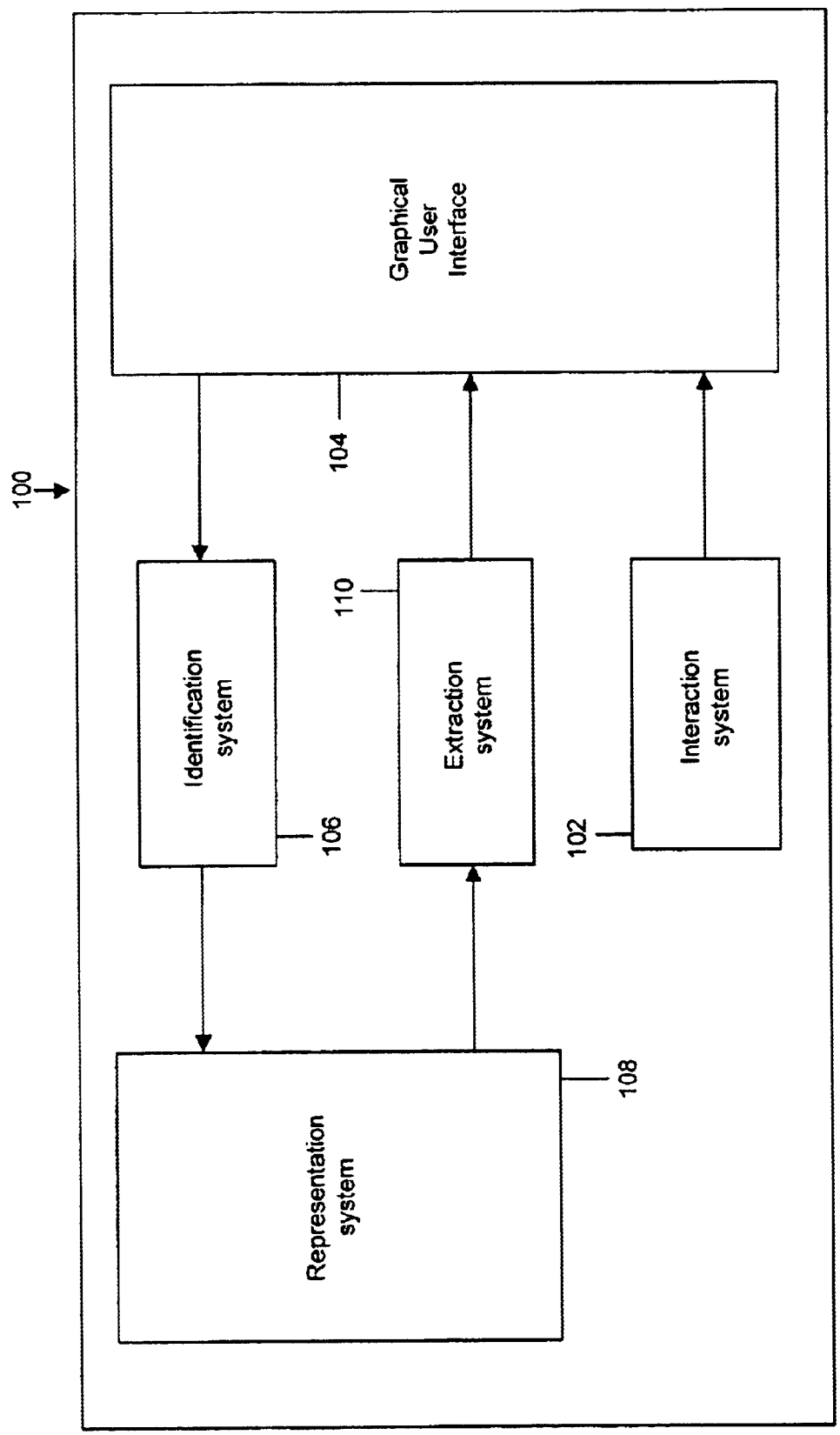
FIG. 1 shows a data navigation system according to the current invention.

FIG. 1 shows a data navigation system 100 that enables a user to selectively view multi-dimensional data in two-dimensional GUI. The data navigation system 100 includes an interaction system 102, a Graphical user Interface (GUI) 104, an identification system 106, a representation system 108 and an extraction system 110; as shown in FIG. 1. The multi-dimensional data is represented using the representation system 108 and is presented in two-dimensional form to the user in GUI 104. GUI 104 has a plurality of navigation symbols that enable the user to browse through the multi-dimensional data in the two-dimensional GUI 104. Thus, the navigation symbols enable the user to specify one or more products whose data he/she wishes to view in GUI 104. The user can interact with these navigation symbols through interaction system 102. When the user interacts with one of the navigation symbols, the identification system 106 identifies the data in representation system 108 that the user wishes to view in GUI 104 by recording the user interaction with the navigation symbol. The extraction system 110 then extracts the identified data from representation system 108 and sends it to GUI 104, where the user can view the data.

Data navigation system 100 can be preferably executed on a general-purpose computer system. A computer system typically contains a central processing unit (CPU), input/output devices and a computer memory. The input/output devices include one or more computer readable media drives, which can be used to install software products, such as the components of the data navigation system, provided on a computer readable medium, such as CD-ROM. Interaction system 102 of data navigation system 100 can be executed preferably using an input device of such a computer system. Graphical User Interface (GUI) 104 displays the data to the user and can be implemented preferably using the output devices of such a computer system. Identification system 106 and extraction system 110 are preferably implemented using the CPU. The representation means that represents the multi-dimensional data may be stored in the computer memory. While the data navigation system is preferably implemented on a computer system as described above, it will be obvious to those skilled in the art that it may also be implemented on computer systems having different configurations, and in different ways.

FIG. 2 shows Graphical User Interface (GUI) 200 provided by the present invention that allows a user such as a production manager in the shoe manufacturing company to view the demand forecast for shoes. GUI 200 shows the three broad styles of shoes manufactured in this company. GUI 200 consists of a number of rows and columns that present the forecast data to the planner who is in this case, say, the production manager. The first column that contains a cell 202 that lists the styles manufactured in the company. For example, the style ProJoggers 222 is shown in the first column. GUI 200 also lists the sales periods for which demand forecasts are available along the columns. Thus, the first row of GUI 200 shows the sales periods from January '02 to July '02. GUI 200 also contains columns to represent the dimensions used to distinguish products within a style. The color dimension 204 is shown in the second column, the size dimension 206 in the third column and the width dimension 208 in the fourth column of GUI 200. These three dimensions are used to define all shoes of all styles in this shoe manufacturing company.

FIG. 3 shows the multi-dimensional data for the demand forecast stored in a set of two-dimensional arrays 300. The demand forecast for the styles, corresponding to a particular sales period, is stored as a numerical value in an array 302. Array 302 is used to fill the contents of GUI 200 shown in FIG. 2. For example, cell 214 in GUI 200 contains a demand forecast of 60 units that has been obtained by extracting this numerical data from array 302. The data was extracted using the corresponding sales period 210 and the corresponding style ProJoggers 222, and by searching in array 302. Similarly, the forecast demand can be filled in other cells such as 216 and 218 of GUI 200. For each of these cells the demand forecast data is extracted by first identifying the relevant style and the relevant sales period. Then, the demand forecast is extracted from array 302. The steps of identification and extraction may be performed by software as is well known in the art. The cell 212 in GUI 200 shows the aggregate demand in the sales period 210. The contents of cell 212 are obtained by aggregating the demand forecast of all styles during sales period 210. Thus, cell 212 represents the aggregate of demand forecasts 214, 216 and 218. This aggregate forecast data may be desired by the production manager to quantify any trends in the aggregate demand for all styles produced by the company.

The dimensions used to distinguish the styles in this company are shown in FIG. 3. Thus, the style ProJoggers is defined using color, width, and size dimensions as shown in an array 304. These three dimensions are also used to define the style ProGolf in array 306, and the style ProTennis in an array 308. The finite set of dimension values corresponding to a dimension is also shown in arrays 304, 306 and 308. For example, array 304 shows the five dimension values Blue, Black, Green, Brown and Red used to characterize the color dimension for the style ProJoggers. Further, there are numbers corresponding to each dimension value in the dimension in each array 304, 306 or 308. For example, in array, 304 for ProJoggers, the numbers corresponding to the dimension values in the color dimension are 0,1,0,1 and 0. These numbers represent the relative proportion of these colors in the aggregate demand forecast for style ProJoggers. Since the numbers corresponding to both Black and Brown are 1, and the rest of the numbers are zero, the ratio of the demand for black ProJoggers to brown ProJoggers is 1:1, and these two colors each account for half the demand for ProJoggers. Henceforth, this set of numbers corresponding to a dimension is called a demand ratio for a particular dimension since these numbers represent the proportion of demand along that particular dimension. Further, in arrays 304, 306 and 308, the demand ratio includes zero values. In this embodiment of the invention, we have assumed that a zero value in the demand ratio means that the style will never be offered in that dimension value. So, for example, since the demand ratio for color Red in the ProTennis style is 0, that style will never be manufactured or offered in the color Red. In other words, the demand ratio for color Red in the ProTennis style will always remain exactly zero. Hence in this embodiment, the GUI does not display any data corresponding to the Red color in the ProTennis style. However, it will be obvious to those skilled in the art that the distinct case of the style being offered in that dimension value but the forecast being temporarily zero, in which it may be desirable to show the related forecast data in the GUI, can easily be addressed in an alternative embodiment.

The demand ratios stored in arrays 304, 306 and 308 are used to disaggregate the demand forecast for styles stored in array 302. The disaggregated demand forecast, corresponding to one or more SKUs is then presented to the user using GUI 200.

Figure 4:
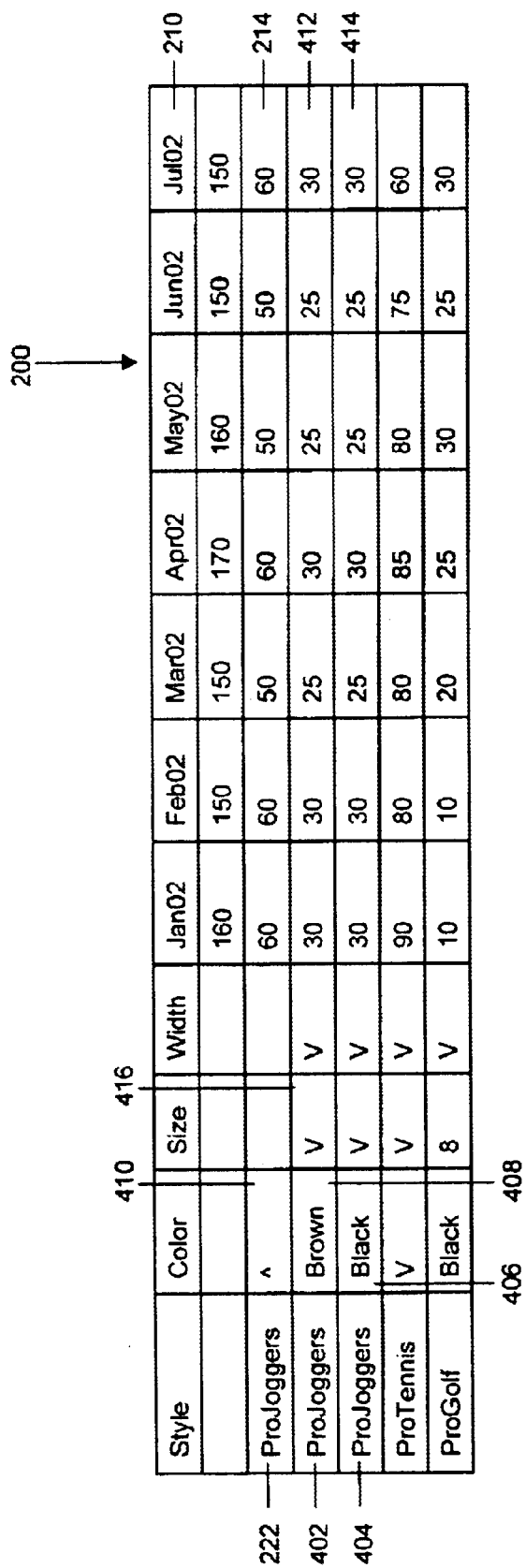
FIG. 4 illustrates the Graphical User Interface that displays a selective view of the multidimensional data according to the present invention.

Referring to FIG. 2, the cells in the columns corresponding to color 204, size 206 and width 208 are filled using information regarding the dimensions used to represent the styles as stored in the set of arrays 300. For example, in cell 220 corresponding to style ProJoggers 222 there is a navigation symbol that enables the user to specify the SKUs in the style ProJoggers 222 of which demand forecast is to be displayed. These navigation symbols enable the user to specify one or more specific SKUs for which the view of multi-dimensional data is sought. The navigation symbol in cell 220 allows the user to view the disaggregated demand forecast for the corresponding style (ProJoggers 222) along the selected dimension (color 204). Pluralities of navigation symbols thus enable the user to navigate through the forecast data. In cell 220, the navigation symbol has been represented using the symbol 'v' to suggest to the user that the demand forecast can be further disaggregated. GUI 200 that results when the user activates a navigation symbol is shown in FIG. 4. A mouse click, a keyboard stroke, a voice command, a touch screen or other forms of user input known in the art might be used to activate the navigation symbols. Once activated, GUI 200 changes to show a different view of the multi-dimensional information stored in the arrays 300. Additionally, the original navigation symbols may transform into a different symbol that permits the user to return to a more aggregated (here, previous) view of GUI 200. For example, the symbol 'v' which allows for disaggregating forecasts may change into the symbol '^' that suggests to the user that he/she can transform GUI 200 back into the aggregated state. However, the navigation symbols are not provided in all the cells of columns corresponding to the dimensions 304, 306 and 308. For example, no navigation symbols corresponding to the color and size dimensions are provided in the ProTennis style; instead the values Black and 8 are displayed. The navigation symbols are not displayed because there is only one dimension value corresponding to these dimensions as shown in array 308. Thus, a navigation symbol is not provided for this particular combination of dimension and style, since no further disaggregation is logically possible.

FIG. 2 shows that the number of columns required for these navigation symbols is at least equal to the number of dimensions used to represent all styles of shoes. Thus, three columns have been used corresponding to each dimension, since the three dimensions color, size and width are used to represent all styles as shown in FIG. 2. Further, there are at least as many rows as the number of styles being planned. Additional rows may be introduced in order to identify the columns, such as the first row in GUI 200. Further, the second row in GUI 200 shows the total sales in each sales period. This information, and other such information related to the planned quantities which may be similarly provided, may be valuable to the production manager; for example in trend analysis of aggregate sales, and accordingly has been shown in GUI 200. The number of rows in GUI 200 changes as the user selects the desired view of the multi-dimensional data. The selected view is shown by suitably displaying the data using additional rows to the ones shown in GUI 200 of FIG. 2.

In the above example of the shoe manufacturing company, the demand for styles ProJoggers, ProGolf and ProTennis is forecast. Each of these styles represents an aggregation of SKUs that are distinguished using one or more dimensions. It will be appreciated by those skilled in the art that forecasts may be made at a higher or lower level of aggregation of SKUs, depending on the accuracy of the forecasting technique. The present invention is not limited by the level at which the forecast is made. The concept of demand ratios may be readily expanded to cover a higher level of aggregation. For example, if the shoe manufacturing company forecasts separately for men, women and children's shoes, while having the same three styles for each category, then the concept of demand ratios can be extended to encapsulate the style level. In this case, the proportion of sales between ProJoggers, ProGolf and ProTennis, say 1:2:3, can be captured as a demand ratio. In this case, the higher-level categories, 'Men', 'Women', and 'Children', may appear in the first column of GUI 200.

In the preferred embodiment, the dimensions that are used to distinguish shoes in a style are statistically independent of each other. Two dimensions are statistically independent of each other if there is no correlation between the sales of shoes and a particular combination of dimension values. Thus, independence of dimensions requires that if sales of 'Red' shoes to 'Blue' shoes is 1:2 and that of size '5' shoes to size '7' shoes in 2:3, then the ratio of sales of 'Red' size '5' shoes to 'Blue' size '7' shoes should be 1*2:2*3 or 1:3. In case the dimensions are not independent of each other, the demand forecast for SKUs obtained using the demand ratios will not be representative of the actual proportion of sales between SKUs.

Consider the production manager in the shoe manufacturing company. The manager may need to order polish for shoes of different colors. Hence, he/she needs the demand forecast corresponding to the various colors of shoes. The present invention allows the user to obtain the above forecast by suitably using the navigation symbol, such as the navigation symbol provided in cell 220 of GUI 200.

FIG. 4 illustrates GUI 200 as obtained by activating the navigation symbol 'v' in cell 220. This results in a disaggregation along the color dimension for the style ProJoggers 222. Since there are two non-zero dimension values in the ProJoggers style, two new rows containing the fields 402 and 404 are inserted in GUI 200 to present the forecast data to the user. The number of rows in GUI 200 may be adjusted by insertion or deletion of rows and data values may be updated in the inserted rows using software means known in prior art. In case there is insufficient visual area to display the entire GUI 200, then appropriate means to scroll the rows may be provided as is known in prior art.

The navigation symbol in cell 220 is related to the color dimension; hence, the new rows are filled by disaggregating the aggregate forecast for style ProJoggers using the demand ratio for the color dimension shown in array 304. Therefore, the cells 406 and 408 display the colors Black and Brown corresponding to the dimension values in the color dimension as shown in array 304. The cell 410, which has replaced cell 220, now has a navigation symbol 'A'. This symbol allows the user to restore the table to the state of aggregated demand forecasts. For example, demand forecast 214 for the style ProJoggers 222 has been disaggregated (shown in cells 412 and 414) using the color demand ratio. Thus, the demand forecasts for SKUs black ProJoggers 412 and brown ProJoggers 414 for sales period 210 is 30 and 30 (according to the color demand ratio of 1:1, as shown in array 304). Thus, rows corresponding to cells 402 and 404 show the demand forecast for black ProJoggers and brown ProJoggers for the different sales periods.

Figure 5:
FIG. 5 illustrates another view of the multi-dimensional data selected by a user according to the present invention.

The navigation symbol 'v' in cell 416 next to field 408 allows the user to disaggregate the demand forecast for brown ProJoggers along the size dimension. FIG. 5 illustrates GUI 200 obtained when the user activates the navigation symbol 'v' in cell 416. The forecast data for brown ProJoggers has been further disaggregated along the size dimension. Since there are seven dimension values corresponding to size in the size dimension as shown in array 304, seven new rows are inserted to present the forecast data to the user. The row with cell 506 shows the demand forecast for brown ProJoggers of size 7 for different sales periods. The aggregated forecast for brown ProJoggers shown in field 412 has been disaggregated along the size dimension using the size demand ratio for ProJoggers shown in array 304. (Note that there is some rounding to preserve integer values since fractional values of number of pairs of shoes have no meaning.). For example, the cells 520, 522, 524, 526 contain the demand forecast for sizes 5, 6, 7, and 8 of brown ProJoggers in sales period 210. The value in field 526 is 6, obtained using the proportion of sales of size 8 to other sizes (the size demand ratio). Also note that the navigation symbol '^' allows the user to re-aggregate the demand forecast. Thus, in FIG. 5, if the user clicks the navigation symbol '^' in cell 516, GUI 200 will be as shown in FIG. 4.

GUI 200 as shown in FIG. 5 shows the demand forecast for ProJoggers disaggregated along the color dimension, and then along the size dimension for Brown ProJoggers. The user can thus obtain the total demand for brown ProJoggers as well as the total demand for black ProJoggers. However, the total demand for ProJoggers of size 5 is not available. The forecast for the total demand for ProJoggers of size 5 may be required to order the appropriate quantity of color-independent raw material, say soles of size 5, before production can be initiated. The present invention provides navigation symbols that allow the user to select the order of dimensions in which the demand forecast for styles should be disaggregated.

Figure 6:
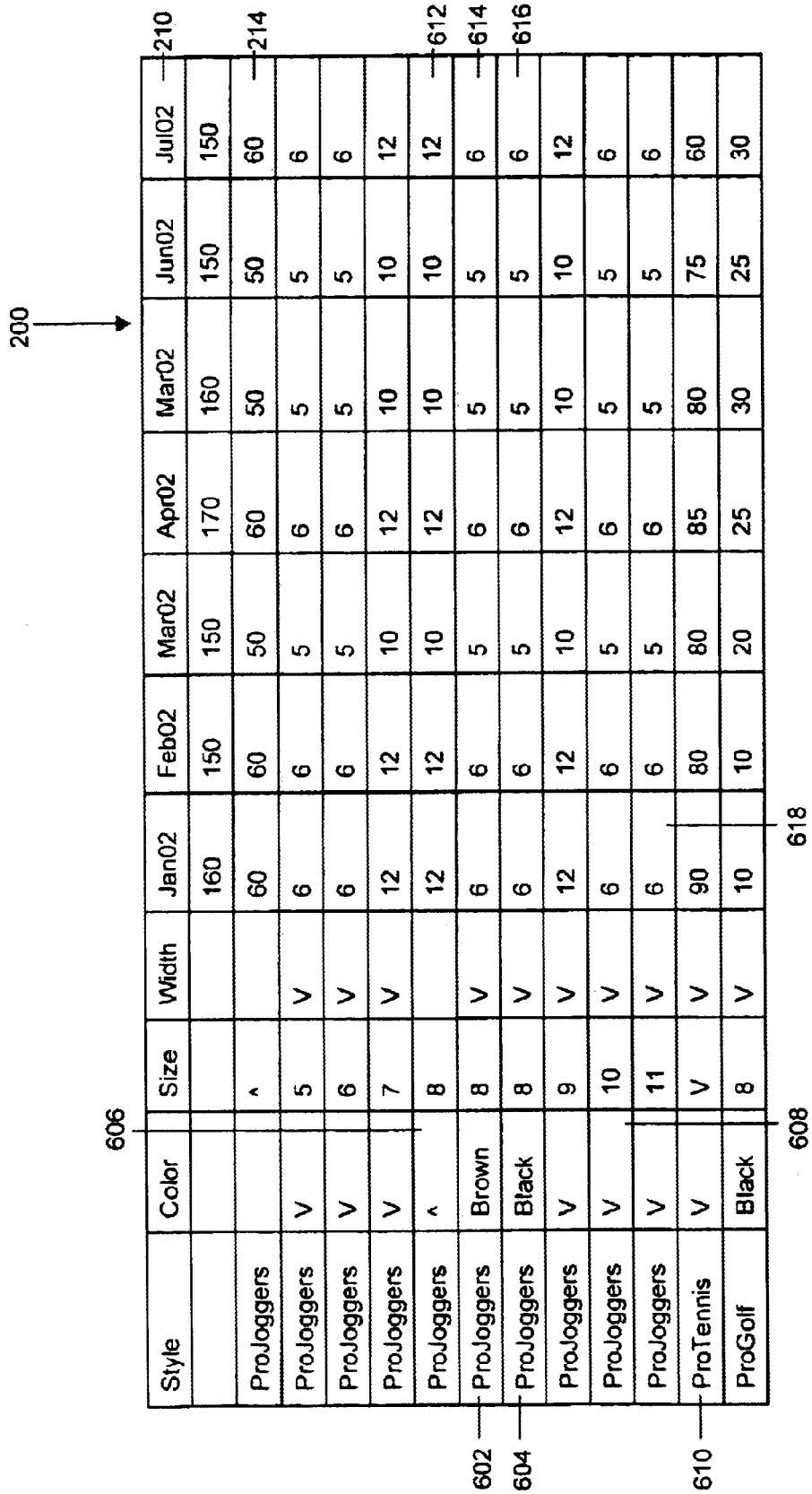
FIG. 6 illustrates yet another view of the multi-dimensional data selected by the user according to the present invention.

GUI 200 shown in FIG. 5, can be reduced to the one shown in FIG. 2 by clicking on the '^' navigation symbols till only the 'v' navigation symbols are present in GUI. The user may now choose to disaggregate by the size dimension by clicking on the navigation symbol 'v' in cell 224. Further, he/she may choose to obtain the demand forecast for brown and black ProJoggers of size 8. The resulting GUI 200 is shown in FIG. 6. The data has been disaggregated along an order of dimensions that is different from the order shown in FIG. 5. Further, the navigation symbol '^' in a cell 606 allows the user to change GUI 200 such that data would only have been disaggregated along the size dimension. The rows having the cells 602 and 604 show the demand forecasts disaggregated along the color dimension for size 8 ProJoggers for multiple sales periods. Cell 612 shows the demand forecast for sales period 210 for size 8 ProJoggers aggregated along the color dimension. Cells 614 and 616 show the forecast value for brown and black size 8 ProJoggers for the sales period 210. Still referring to FIG. 6, the row containing cell 610 shows the forecast for the style ProTennis. Note that the color, size and width dimensions for the style ProTennis have the navigation symbol 'v' indicating that the demand forecast for ProTennis can be disaggregated along one or more of these dimensions. This disaggregation of forecasts may be based on a different order of dimensions than the order used for the style ProJoggers. Hence, the same GUI 200 may simultaneously provide the demand forecast for brown ProJoggers as well as narrow ProTennis shoes thereby enabling the user to customize the order of dimensions for a particular style.

The forecast data that is displayed in GUI 200 is based on the information contained in array 302 of the set of arrays 300. This forecast data is likely to change over a period of time, as new or improved forecasts are available. The demand ratios shown in arrays 304, 306 and 308 may also change over the period of time. These demand ratios may be based either on historical sales proportions or on anticipated sales proportions. In industries such as the fashion industry, there is no available historical sales record for new products that are launched. Thus, the demand ratios in such cases would be obtained using experts' advice or other techniques. Hence, it is possible that over time, the demand ratios are revised to capture the latest expectations and trends. Hence, the data contained in the set of arrays 300 may be continuously updated.

In the preferred embodiment, the data in the set of arrays 300 is updated by a data updating system. The data updating system may be a software interface between the set of arrays 300 and a forecasting unit. In many cases; the forecasting unit may refer to one or more experts who update the forecast for the styles and the demand ratios for the dimensions. In other cases, the forecasting unit may refer to a forecasting engine or software product that uses analytical forecasting techniques known in prior art to update the contents of the set of arrays 300.

FIG. 7 shows the set of arrays 300 containing updated demand forecasts in array 302 as well as the updated demand ratios in arrays 304, 306 and 308. The forecast data array 302 has the updated demand forecast 702 (of 100 units) corresponding to the style ProJoggers for the sales period of January 2002. Further, there is a change in the size demand ratio for the style ProJoggers. Thus, the field 704 in the array 304 for style ProJoggers has also been updated.

Figure 8:
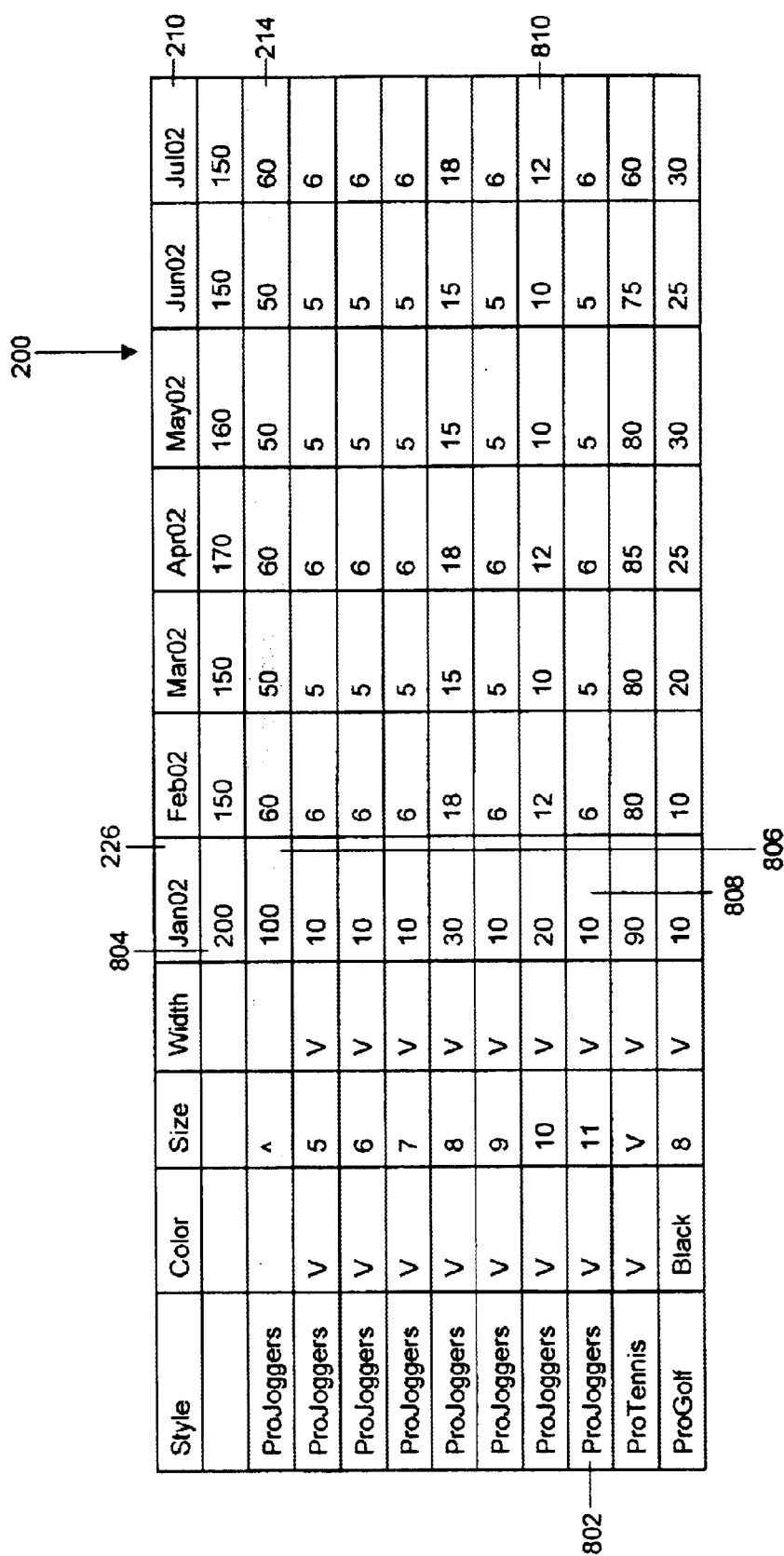
FIG. 8 illustrates a view of the updated multi-dimensional data in the Graphical User Interface according to the present invention.

FIG. 8 shows GUI 200 after the updated forecast data in array 302 for the sales period 226 and updated demand ratio in array 304 has been incorporated. The forecast for style ProJoggers for the sales period 226 has been updated as 100 units as shown in the cell 806. The forecast data aggregated for all styles for the sales period 226 has also been updated to 200 units as shown in the field 804. The updated size demand ratios for style ProJoggers shown in array 304 of FIG. 7 have also been applied. Consequently, field 618 in FIG. 6 that held a forecast of 6 units has been updated to 10 units in the field 808 of FIG. 8. Thus, GUI 200 is updated whenever the information contained in the set of arrays 300 is updated by the data updating system.

The data updating system would typically update the set of arrays 300 using information from experts or from a forecasting engine. However, the data updating system may also provide a GUI that allows the user to modify the contents of the set of arrays 300. In the case when the user is competent to manipulate the contents of the set of arrays 300, then GUI of the present invention may itself be used to update the forecast information and/or the demand ratios.

Figure 9:
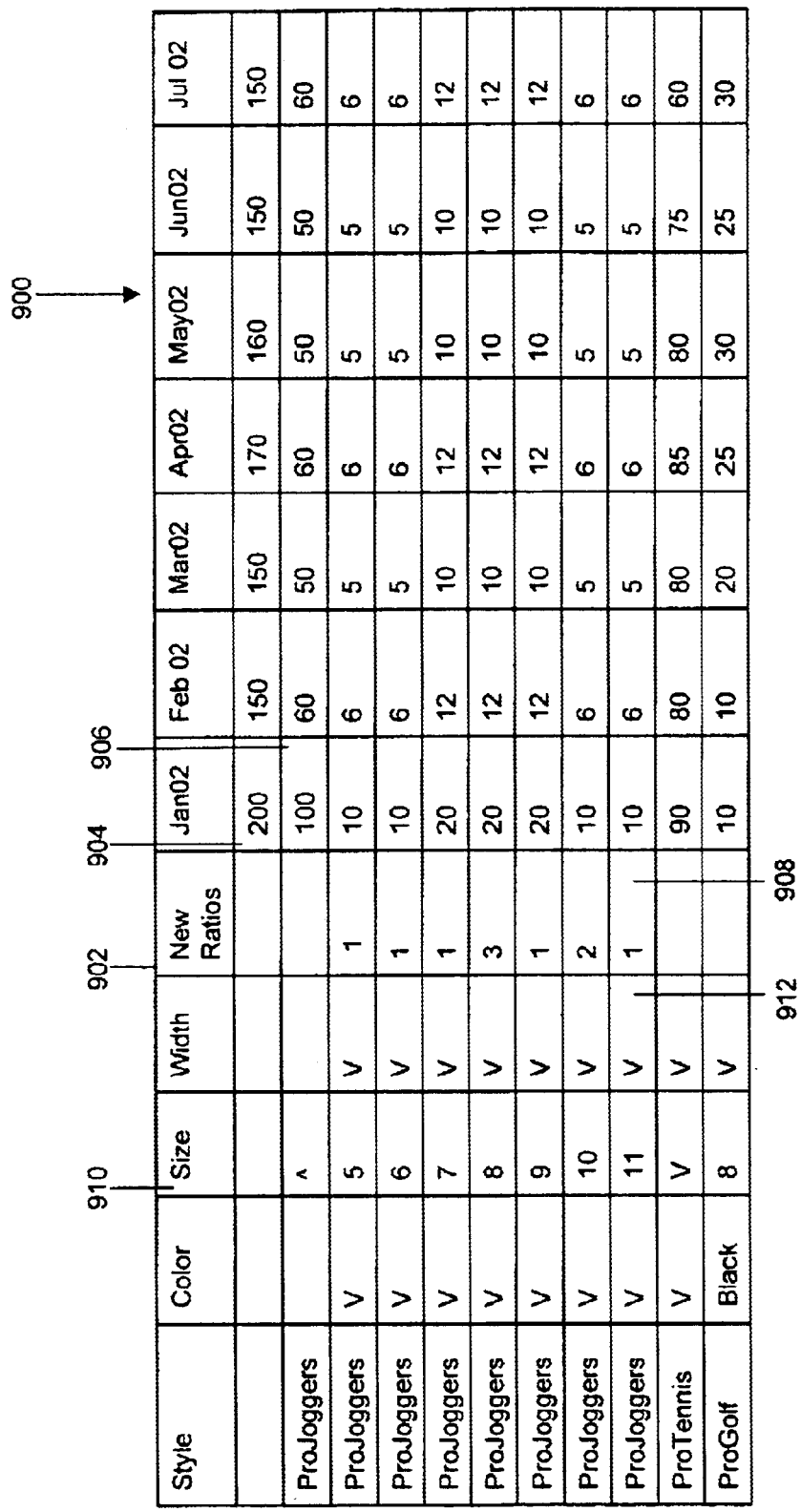
FIG. 9 illustrates a Graphical User Interface that allows a user to update the multi-dimensional data in the Graphical User Interface itself according to the present invention.

FIG. 9 illustrates an alternative embodiment in which a GUI 900 allows the user to update demand forecasts and demand ratios. GUI 900, as compared to GUI 200, contains an additional column (containing the cell 902) where the new demand ratios may be input by the user. In order that the user is able to enter the updated values, cell-editing system should be provided in GUI 900. The cell-editing system may be provided using software code known in prior art. Further, GUI 900 allows the forecast data for each style in any sales period to be edited in-place using the cell-editing system. Thus, the user can modify the contents of the array 302 using GUI 900 itself. Further, the user may modify the demand ratio for a particular dimension, and a particular style, by disaggregating the forecast to the required dimension. For example, to update the size demand ratios, the user first disaggregates the forecast along the size dimension by using the navigation symbol 'v' in the size dimension column containing the cell 910. The updated demand ratios for the size dimension are input in the appropriate cells, such as 912, in the column with cell 902. In addition, the user can modify the forecast of demand by editing the corresponding value in GUI 900. For example, the user can modify the value of total sales for ProJoggers for the sales period of January '02 by editing the value in the cell 906. The aggregate of all sales in a given period, such shown in the cell 904, is automatically updated to reflect changes in the cells such as 906. Further, the cells that contain the disaggregated forecasts, such as the cell 908, are also updated.

In the abovementioned shoe manufacturing company, the same set of demand ratios, shown in arrays 304, 306 and 308, are applied to all the sales periods January '02 to July '02. In an alternative embodiment, a set of demand ratios could be associated with each sales period, or with sets of sales periods. Individual sets of demand ratios may be required to capture changing customer preferences as time progresses. For example, in the fashion industry, a larger proportion of black clothes may be sold in the winter months and a larger proportion of white clothes may be sold in the summer months. Having a set of demand ratios for each sales period enables the user to accurately model these changing customer demand patterns. Further, the user may still use GUI 900 to update the demand ratios for a particular sales period. It will be apparent to those skilled in the art that GUI 900 may be suitably modified to incorporate one or more additional cells, wherein the user may specify the sales period for which the demand ratios have to be updated.

In the above discussion, the invention has been described using numerical values of the sales forecast. However, the invention also envisions that character data may be represented using the GUI. In many industries, qualitative data may be used in decision-making, and the GUI may allow character data to be displayed. For example, for an inventory manager, the decision may simply be to order a fixed replenishment quantity when the inventory falls below a predetermined level. In this case, the GUI may be used to display qualitative inventory levels such as 'high' and 'low'. Another example of a case in which character data is beneficial is to display the level of confidence in demand forecasts. These confidence levels may be used by a planning manager to compute the number of units of raw material to be ordered. The confidence level, provided by the forecasting unit, would enable the planning manager to access the risk associated with ordering the computed number of units. Further, the qualitative confidence level ('high', 'medium', or 'low') may be obtained by mapping the numerical confidence levels (or accuracy of the forecasts) onto character strings. For example, a quantitative error of less than 10 percent in the forecast may map onto the 'high' confidence level.

Figure 10:
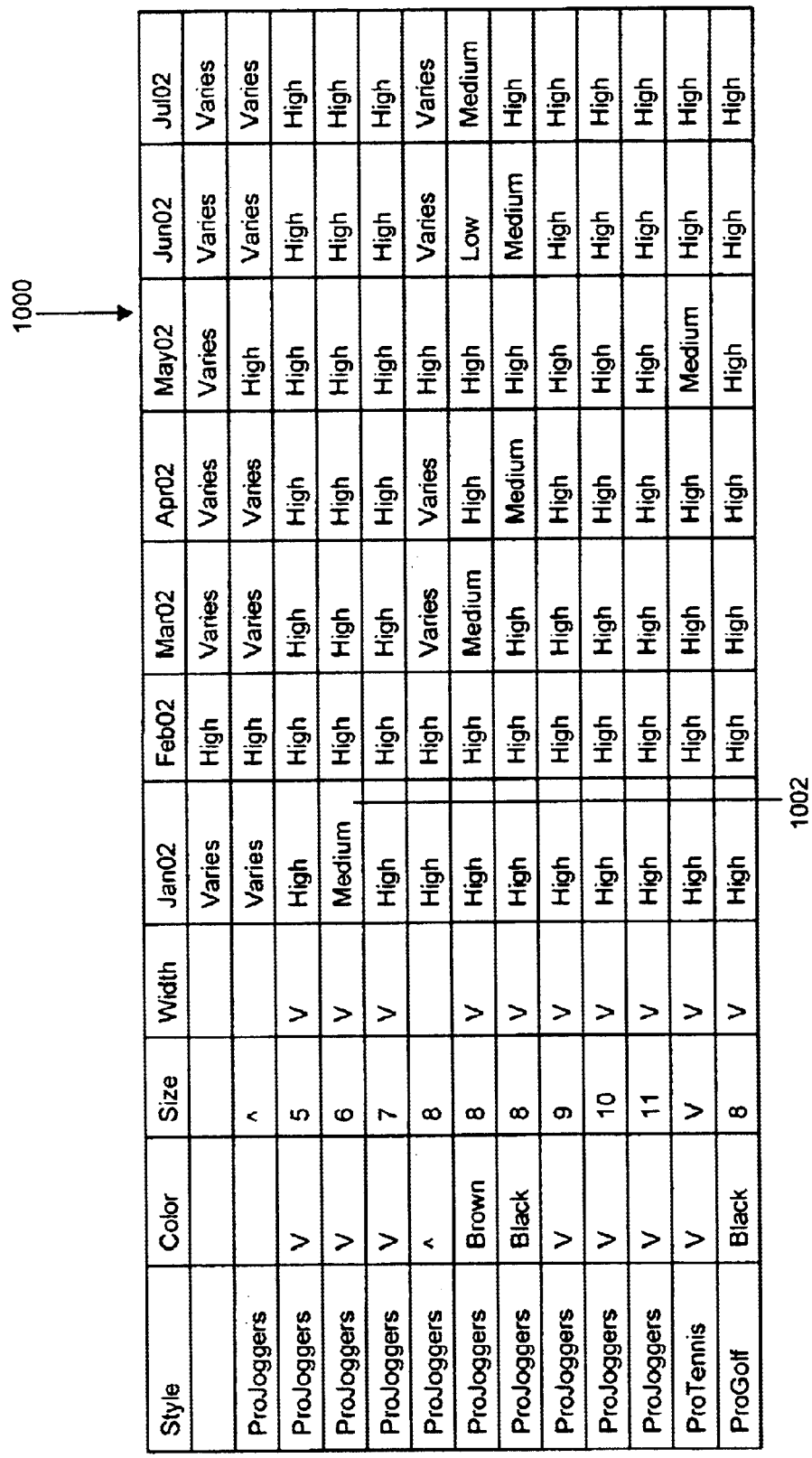
FIG. 10 illustrates a Graphical User Interface that supports character strings according to the present invention.

In another alternative embodiment, the GUI 1000 supports strings as shown in FIG. 10. The qualitative aggregation or disaggregation of strings across various levels may also be done using GUI 1000. In particular, GUI 1000 represents the qualitative degree of confidence in-the-forecasts for various sales periods. The confidence in the forecasts has been obtained for each SKU in the shoe manufacturing company. For example, the confidence in the demand forecast of size 6 ProJoggers is rated as medium in the cell 1002. The degree of confidence in a higher-level forecast typically depends upon the degree of confidence in lower level forecasts. For instance, if the user has a high degree of confidence in the lower level forecasts, such as for SKUs, then the user would also have high confidence in the aggregate forecast of these SKUs. In case the confidence degree varies amongst SKU forecasts in an aggregation of SKUs, the confidence degree associated with the aggregation of SKUs may be 'varies' as shown in FIG. 10.

In a preferred implementation, the qualitative degrees of confidence are derived from the numerical accuracy of the demand forecasts. These numerical values may be aggregated across various levels (or dimensions) by performing suitable mathematical operations, such as averaging or summation of these numerical values. The numerical value for the aggregate level forecast may then be re-mapped to obtain a qualitative string, to be displayed in GUI 1000.

Figure 11:
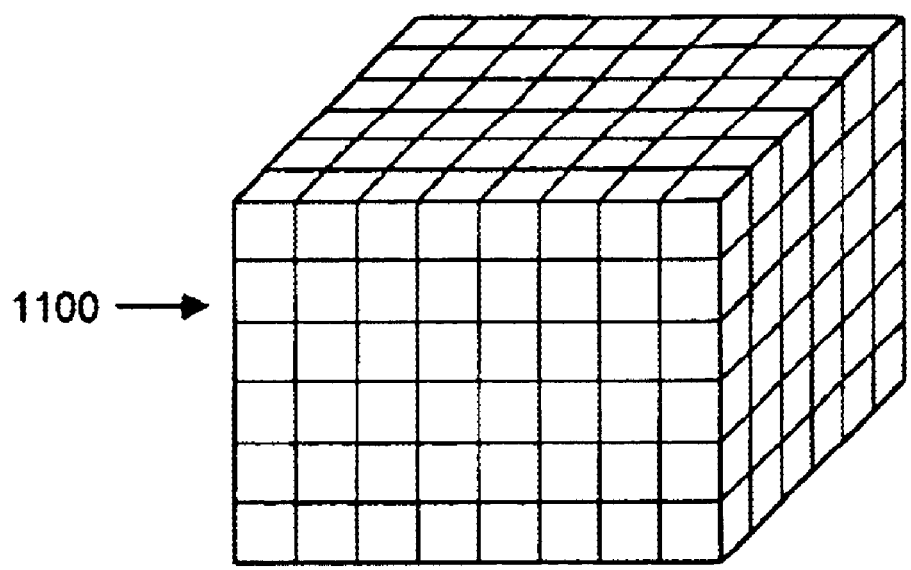
FIG. 11 is a block diagram of a multi-dimensional table to represent multi-dimensional data according to the present invention.

In the above discussion, the demand forecast for individual SKUs has been captured using the set of arrays 300. The set of demand ratios, arrays 304, 306 and 308, are used in conjunction with array 302 to determine the demand forecast for any SKU. Hence, the forecast data for a large number of SKUs has been captured using a set of two-dimensional arrays. In an alternative embodiment for representing the data related to these SKUs, a multi-dimensional table has been used. In this embodiment, each cell in the multi-dimensional table has a numeric data entry, which represents information corresponding to a particular SKU. In this multi-dimensional table, say of n dimensions, one dimension would correspond to the highest level of aggregation, for example the styles. A second dimension of this table would correspond to time, or the sales periods. The remaining (n−2) dimensions would correspond to the number of dimensions used to represent the styles in the shoe manufacturing company. Thus, if there are three dimensions used to represent shoes, such as color, size and width, then a 5 (=3+2) dimensional table can be used to capture the demand forecast for all the SKUs in the shoe manufacturing company. FIG. 11 shows one such multi-dimensional table 1100. Thus, the forecast for a SKU having a particular combination of dimension values (corresponding to each dimension) in a particular sales period can be read from the unique cell in the n-dimensional table 1100. Thus, the data navigation system corresponding to this embodiment of the representation of the data sought would identify the SKUs for which information is sought, process the demand forecasts by aggregating information in n-dimensional table 1100, and display the result in the appropriate cells of the GUI.

It will be appreciated by those skilled in the art that the present invention may also be used to browse multi-dimensional data unrelated to the planning operation in industries. For example, any multi-dimensional data in numeric or alphanumeric form may be browsed in two-dimensions using the data navigation system disclosed in the present invention. Suitable mathematical formulae, known in the art, may be used to aggregate the values along the dimensions, whenever navigation symbols in the GUI are used to aggregate the numerical values in the cells. For example, a motion picture may be represented using three dimensions—the X-Y plane having two dimensions for the static images, and a time dimension to capture the changing sequence of images. The GUI disclosed in the above invention may be used to present the above numerical information to the user in two-dimensions. For example, if the GUI displays the X-Y 1 dimensions, then navigation symbols may be used to view how a particular area of the X-Y plane changes over a period of time, the third dimension. Thus, the present invention enables a user to view multi-dimensional data in two dimensions.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A forecast presentation system suitable for enabling a user to selectively view multi-dimensional demand forecast data of products for multiple sales periods, the products being aggregated in product categories, the demand forecast data being available for product categories, the products being defined using one or more dimensions, each dimension having a finite number of dimension values, the forecast presentation system comprising:

representation means for representing the multi-dimensional demand forecast data;

a graphical user interface for displaying the demand forecast data in two dimensions;

identification means for identifying a specific selection of one or more products selected by the user using the graphical user interface; and extraction means for obtaining the demand forecast data from the representation means using the identified one or more products; and interaction means for enabling the user to interact with the graphical user interface in which the user views demand forecast data of one or more products on the graphical user interface by selecting the products using the interaction means, the demand forecast data being identified and processed from the demand forecast data of product categories stored in the representation means.

2. The forecast presentation system as recited in claim 1, wherein the representation means comprises:

a two-dimensional array storing the aggregate demand for each product category for every sales period; and a set of arrays for storing proportion of demand of each dimension value in a dimension of a product category, the set comprising as many arrays as the number of product categories, in which the demand for one or more products in any sales period is obtained by disaggregating the demand forecast stored in the two-dimensional array using the proportions of demand attributed to the products as stored in the set of arrays.

3. The forecast presentation system as described in claim 1, wherein the representation means comprises:

a two-dimensional array storing the aggregate demand for each product category for every sales period; and a set of arrays for storing proportion of demand of each dimension value in a dimension of a product category, each array storing proportion of demand for a particular product category and a particular sales period, in which the demand for one or more products in any sales period is obtained by disaggregating the demand forecast stored in the two-dimensional array using the proportions of demand attributed to the products as stored in the set of arrays.

4. The forecast presentation system as described in claim 1, wherein the graphical user interface comprises:

a plurality of rows, the number of rows corresponding to the number of product categories;

a plurality of columns, the number of columns corresponding to the number of sales periods;

row updating means for inserting and deleting rows and filling data in the inserted rows; and a plurality of navigation means that enable the user to specify a specific selection of one or more products in which the user uses the interaction means in conjunction with one or more navigation means to have a specific selection of one or more products of which the demand forecast is displayed in the rows and columns of the graphical user interface.

5. The forecast presentation system as recited in claim 4, wherein the navigation means are a set of symbols that are activated using the interaction means, each symbol representing a specific selection of one or more products.

6. The forecast presentation system as recited in claim 1, wherein the interaction means is at least one of a keyboard, a mouse, a voice activated device and a touch screen.

7. The forecast presentation system as recited in claim 1, wherein the graphical user interface displays character strings.

8. The forecast presentation system as recited in claim 1, wherein the graphical user interface comprises:

a plurality of rows, the number of rows corresponding to the number of product categories;

a plurality of columns, the number of columns corresponding to the number of sales periods;

row updating means for inserting and deleting rows and filling data in the inserted rows;

cell-editing means for enabling the user to change the demand forecast and the proportion of demand using the graphical user interface and the interaction means; and a plurality of navigation means for enabling the user to specify one or more products in which the user uses the interaction means in conjunction with one or more navigation means to select one or more products of which the demand forecast is displayed in the rows and columns of the graphical user interface.

9. A data navigation system suitable for enabling a user to selectively view multi-dimensional data, the multi-dimensional data presented to the user in two dimensional form, the multi-dimensional data being of n dimensions, the n dimensions classified as a first dimension, a second dimension and navigation dimensions, each dimension having a finite number of dimension values, the data navigation system comprising:

representation means for representing the multi-dimensional data;

a graphical user interface for displaying the multi-dimensional data in two dimensions;

identification means for identifying the multi-dimensional data in the representation means that is to be displayed on the graphical user interface;

extraction means for extracting the identified multi-dimensional data from the representation means; and interaction means for enabling the user to interact with the GUI in which the interaction means enables the user to select multi-dimensional data from the representation means, the identification means identifying the selected multi-dimensional data in the representation means, the extraction means extracting the identified multi-dimensional data from the representation means, the graphical user interface displaying the selected view of the multi-dimensional data.

10. The data navigation system as recited in claim 9, wherein the data representation means for multi-dimensional data is an n-dimensional table.

11. The data navigation system as described in claim 9, wherein the graphical user interface comprises:
a plurality of rows;
a plurality of columns, the columns and the rows representing two dimensions of the two dimensional form;
row updating means for inserting and deleting rows and updating the data in the inserted rows; and
a plurality of navigation means that enable the user to select the multi-dimensional data to be displayed in the GUI upon activation.

12. The data navigation system as described in claim 9, wherein the graphical user interface comprises:
a plurality of rows;
a plurality of columns, the columns and the rows representing the two dimensions of the two dimensional form;
row updating means for inserting and deleting rows and updating the data in the inserted rows;
cell-editing means for changing the data present in the rows and columns of the GUI,
whereby the two dimensional data is displayed in rows and columns and the user is shown data by using the row updating means.

13. The data navigation system as recited in claim 9, wherein the interaction means is at least one of a keyboard, a mouse, a voice activated device and a touch screen.

14. The data navigation system as recited in claim 10, wherein the n-dimensional table supports numerical data.

15. The data navigation system as recited in claim 10, wherein the n-dimensional table supports string data.

16. The data navigation system as recited in claim 11 wherein the identification means identifies the data in the representation means using the navigation means activated by the user.

17. The data navigation system as recited in claim 11, wherein the navigation means is activated using the interaction means.

18. The data navigation system as recited in claim 11, wherein the navigation means are a set of symbols, each symbol representing a specific operation that will be performed on the data being displayed in the graphical user interface.

19. A method for representing multi-dimensional data in a two dimensional graphical user interface comprising rows and columns, the multi-dimensional data stored using a representation means, the multi-dimensional data being of n dimensions, the n dimensions classified as first dimension, second dimension and as navigation dimensions, each dimension having a finite number of dimension values, comprising:

placing the first dimension of the multi-dimensional data along the columns and the second dimension of the multi-dimensional data along the rows of the two-dimensional table;

filling the rows and columns of the two-dimensional graphical user interface using the multi-dimensional data stored using the representation means;

introducing a plurality of navigation means in the two-dimensional graphical user interface, each navigation means enabling a user to select a particular view of the multi-dimensional data;

recording a user interaction at one of the navigation means, the navigation means being activated as a result of the user interaction;

processing the recorded user interaction to determine the view of the multi-dimensional data to be displayed in the graphical user interface; and updating the display of the multi-dimensional data in the two-dimensional table according to the determined view of the multi-dimensional data.

20. The method as recited in claim 19, wherein the step of filling comprises:
identifying all the dimension values for each data that is to be filled in the graphical user interface;
identifying the view of the multi-dimensional data that is to be filled in the GUI using the identified dimensions; and
extracting the identified data from the representation means.

21. The method as recited in claim 19, wherein the step of processing comprises:
identifying the multi-dimensional data in the representation means using an identification means and the recorded user interaction; and
extracting the identified data from the representation means to be displayed in the two-dimensional graphical user interface using the extraction means.

22. The method as recited in claim 19, wherein the step of updating comprises:
updating the activated navigation means to a different navigation means;
updating the number of rows in the graphical user interface to allow for more or less information to be displayed in the graphical user interface;
updating the data in the changed rows on the basis of the combination of value in the first dimension, the values in the second dimension and the navigation dimension corresponding to the activated navigation means.

23. A computer program product for representing multi-dimensional data in a two dimensional graphical user interface comprising rows and columns, the multi-dimensional data stored using a representation means, the multi-dimensional data being of n dimensions, the n dimensions classified as first dimension, second dimension and as navigation dimensions, each dimension having a finite number of dimension values, the computer program product embodied on one or more computer readable media and comprising:

computer readable program code means for placing the first dimension of the multi-dimensional data along the columns and the second dimension of the multi-dimensional data along the rows of the two-dimensional table;

computer readable program code means for filling the rows and columns of the two-dimensional graphical user interface using the multi-dimensional data stored using the representation means;

computer readable program code means for introducing a plurality of navigation means in the two-dimensional graphical user interface, each navigation means enabling a user to select a particular view of the multi-dimensional data;

computer readable program code means for recording a user interaction at one of the navigation means, the navigation means being activated as a result of the user interaction;

computer readable program code means for processing the recorded user interaction to determine the view of the multi-dimensional data to be displayed in the graphical user interface; and computer readable program code means for updating the display of the multi-dimensional data in the two-dimensional table according to the determined view of the multi-dimensional data.

24. The computer program product as recited in claim 23, wherein the computer readable program code means for filling further comprises:

computer readable program code means for identifying all the dimension values for each data that is to be filled in the graphical user interface;

computer readable program code means for identifying the view of the multi-dimensional data that is to be filled in the GUI using the identified dimensions; and computer readable program code means for extracting the identified data from the representation means.

25. The computer program product as recited in claim 23, wherein the computer readable program code means for processing further comprises:

computer readable program code means for identifying the multi-dimensional data in the representation means using an identification means and the recorded user interaction; and computer readable program code means for extracting the identified data from the representation means to be displayed in the to-dimensional graphical user interface using the extraction means.

26. The computer program product as recited in claim 23, wherein the computer readable program code means for updating further comprises:

computer readable program code means for updating the activated navigation means to a different navigation means;

computer readable program code means for updating the number of rows in the graphical user interface to allow for more or less information to be displayed in the graphical user interface;

computer readable program code means for updating the data in the changed rows on the basis of the combination of value in the first dimension, the values in the second dimension and the navigation dimension corresponding to the activated navigation means.

27. A forecast presentation and updating system suitable for enabling a user to selectively view multi-dimensional data for products along multiple sales periods and updating the demand forecast data, the products being aggregated in product categories, the demand forecast data being available for product categories, the products being defined using one or more dimensions, each dimension having a finite number of dimension values, the forecast presentation and updating system comprising:

representation means for representing the demand forecast data;

a graphical user interface for displaying the demand forecast data in two dimensions;

identification means for identifying a specific selection of one or more products selected by the user using the graphical user interface; and processing means for obtaining the demand forecast data from the representation means using the identified one or more products;

interaction means for enabling the user to interact with the graphical user interface;

data-updating means for updating the demand forecast data being represented by the representation means, and wherein the user views the data of one or more products on the graphical user Interface by selecting the products using the interaction means, the data being identified and processed from the demand forecast data being represented in the representation means, the demand forecast being updated using the data updating means.

28. The forecast presenting and updating system as recited in claim 27, wherein the data-updating means uses a forecasting system to update the data represented in the representation means.

* * * * *